United States Patent [19]

Itakura

[11] Patent Number: 4,993,377
[45] Date of Patent: Feb. 19, 1991

[54] AUTOMOBILE HEATING APPARATUS AND HEAT GENERATOR FOR THE SAME

[75] Inventor: Masato Itakura, Toyota, Japan
[73] Assignee: Aisin Seiki Kabushiki Kaisha, Kariya, Japan
[21] Appl. No.: 488,945
[22] Filed: Mar. 5, 1990
[30] Foreign Application Priority Data
Mar. 21, 1989 [JP] Japan .................................. 1-68496
[51] Int. Cl.$^5$ ............................................ F02N 17/02
[52] U.S. Cl. ............................ 123/142.1 R; 123/41.14
[58] Field of Search .................... 123/142.5 R, 41.14

[56] References Cited
U.S. PATENT DOCUMENTS
4,393,824 7/1983 Fischer et al. ............... 123/142.5 R
4,911,110 3/1990 Isoda et al. .................. 123/142.5 R FOREIGN PATENT DOCUMENTS
59-121476 8/1984 Japan .

Primary Examiner—E. Rollins Cross
Attorney, Agent, or Firm—Oblon, Spivak, McClelland, Maier & Neustadt

[57] ABSTRACT

An automobile heating apparatus according to this invention includes: a water pump for circulating the cooling water for an automobile water-cooling engine; a radiator for heating the air to be introduced into the automobile room by utilizing the cooling water delivered by the water pump as a heat source; and a hot water circuit for circulating the cooling water in the automobile water-cooling engine, the water pump and the radiator; wherein a heat generator is disposed in the hot water circuit at an upstream portion with respect to the radiator, and the heat generator includes; a heat generating chamber having a labyrinth groove and containing viscous fluid therein; a housing disposed adjacent to the heat generating chamber and having a heat receiving path constituting part of the hot water circuit; a shaft held rotatably in the housing and receiving the rotary torque of the automobile water-cooling engine by way of clutch means; and a rotor fixed on the shaft at an end thereof and having a labyrinth groove disposed in the heat generating chamber. The automobile heating apparatus is down-sized and light-weighted by only providing this simple and compact heat generator in the hot water circuit thereof, because there is no further need for connecting the exhaust pipe and the hot water circuit for heating by way of the heat exchanger of large size as in a prior art automobile heating apparatus.

8 Claims, 3 Drawing Sheets

AUTOMOBILE HEATING APPARATUS AND HEAT GENERATOR FOR THE SAME

BACKGROUND OF THE INVENTION

1. Field of the Invention

This invention relates to an automobile heating apparatus and a heat generator for the same.

2. Description of the Prior Art

One of the prior arts in the field of automobile heating apparatus is set forth in Japanese Unexamined Utility Model Publication No. 121476/1984.

As illustrated in FIG. 3, in the prior art automobile heating apparatus, the heat is exchanged between the high temperature exhaust gas and the cooling water by way of a heat exchanger when cold-starting the engine or travelling normally in a cold district, namely when the engine cooling water flowing in the hot water circuit for heating has not been heated sufficiently. Whereby the cooling water flowing in the hot water circuit for heating is heated in order to improve the heating capacity.

To be more precise, the heat of the high temperature exhaust gas flowing in an exhaust pipe 51 is absorbed by a heat absorbing portion 52a of a heat exchanger 52 disposed in the exhaust pipe 51. The absorbed heat is then radiated to the cooling water flowing in a hot water circuit 53 for heating by a heat radiating portion 52b of the heat exchanger 52. The cooling water flowing in the hot water circuit 53 for heating is heated accordingly, and delivered to a heating apparatus 54.

However, in the prior art automobile heating apparatus, the effective heat transfer area of the heat absorbing portion 52a of the heat exchanger 52 should be made large in order to attain a predetermined heating capacity, because the thermal conductivity of the gas, i.e., the exhaust gas is smaller than the thermal conductivity of the liquid, i.e., the cooling water by a factor of several tens. But, when a large heat absorbing portion 52a of the heat exchanger 52 is disposed in the exhaust pipe 51, the exhaust pipe 51 comes to have a sharply reduced area for flowing the exhaust gas. There accordingly arise fears for the clogged exhaust pipe 51 due to soot, the reduced engine output or engine troubles due to the increasing back pressure applied to the engine. In addition, the heat exchanger 52 should be enlarged as a whole when enlarging the heat absorbing portion 52a, and it has been troublesome to install the thus enlarged heat exchanger 52 on automobiles.

SUMMARY OF THE INVENTION

It is therefore an object of this invention to provide an automobile heating apparatus for heating the cooling water in a hot water circuit for heating and a light-weighted and compact heat generator therefor. Whereby the automobile heating apparatus is downsized but the heating capacity thereof is improved remarkably.

The above and other objects are achieved by an automobile heating apparatus according to this invention comprising: a water pump for circulating the cooling water for an automobile water-cooling engine; a radiator for heating the air to be introduced into the automobile room by utilizing the cooling water delivered by the water pump as a heat source; and a hot water circuit for circulating the cooling water in the automobile water-cooling engine, the water pump and the radiator; wherein a heat generator is disposed in the hot water circuit at an upstream portion with respect to the radiator, and the heat generator comprises: a heat generating chamber having a labyrinth groove and containing viscous fluid therein; a housing disposed adjacent to the heat generating chamber and having a heat receiving path constituting part of the hot water circuit; a shaft held rotatably in the housing and receiving the rotary torque of the automobile water-cooling engine by way of clutch means; and a rotor fixed on the shaft at an end thereof and having a labyrinth groove disposed in the heat generating chamber.

In the automobile heating apparatus according to this invention, since the heat generator carries out the heat exchange resulting from the heat transfer from a liquid (the viscous fluid) to another liquid (the cooling water), the heat conductivity is high, and the automobile heating apparatus as a whole is light-weighted and downsized.

Further, there is no need for connecting the exhaust pipe and the hot water circuit for heating with the heat exchanger as described in the automobile heating apparatus of the prior art. Namely, since it is only necessary to dispose the heat generator in the hot water circuit for heating at an upstream portion with respect to the radiator, the arrangement of this invention is favorable in view of the manufacturing cost of the automobile heating apparatus, and makes the installation of the automobile heating apparatus on an automobile easier.

Furthermore, in the prior art automobile heating apparatus, the temperature of the exhaust gas is low when travelling under the low load condition, and the heat transfer capacity of the heat exchanger utilizing the heat of the exhaust gas is accordingly low. On the contrary, in this invention, since the heat generator works fully when the engine is running, and the heat generating capacity thereof is sufficient, it is possible to perform the heating of an automobile quickly.

In addition, since the heating capacity of the heat generator according to this invention can be varied as desired by changing the viscosity coefficient of the viscous fluid contained and sealed in the heat generating chamber, the automobile heating apparatus according to this invention can be provided on any automobile regardless of its size.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Having generally described this invention, a further understanding can be obtained by reference to a certain specific preferred embodiment which is provided herein for purposes of illustration only and are not intended to be limiting unless otherwise specified.

Figure 1:
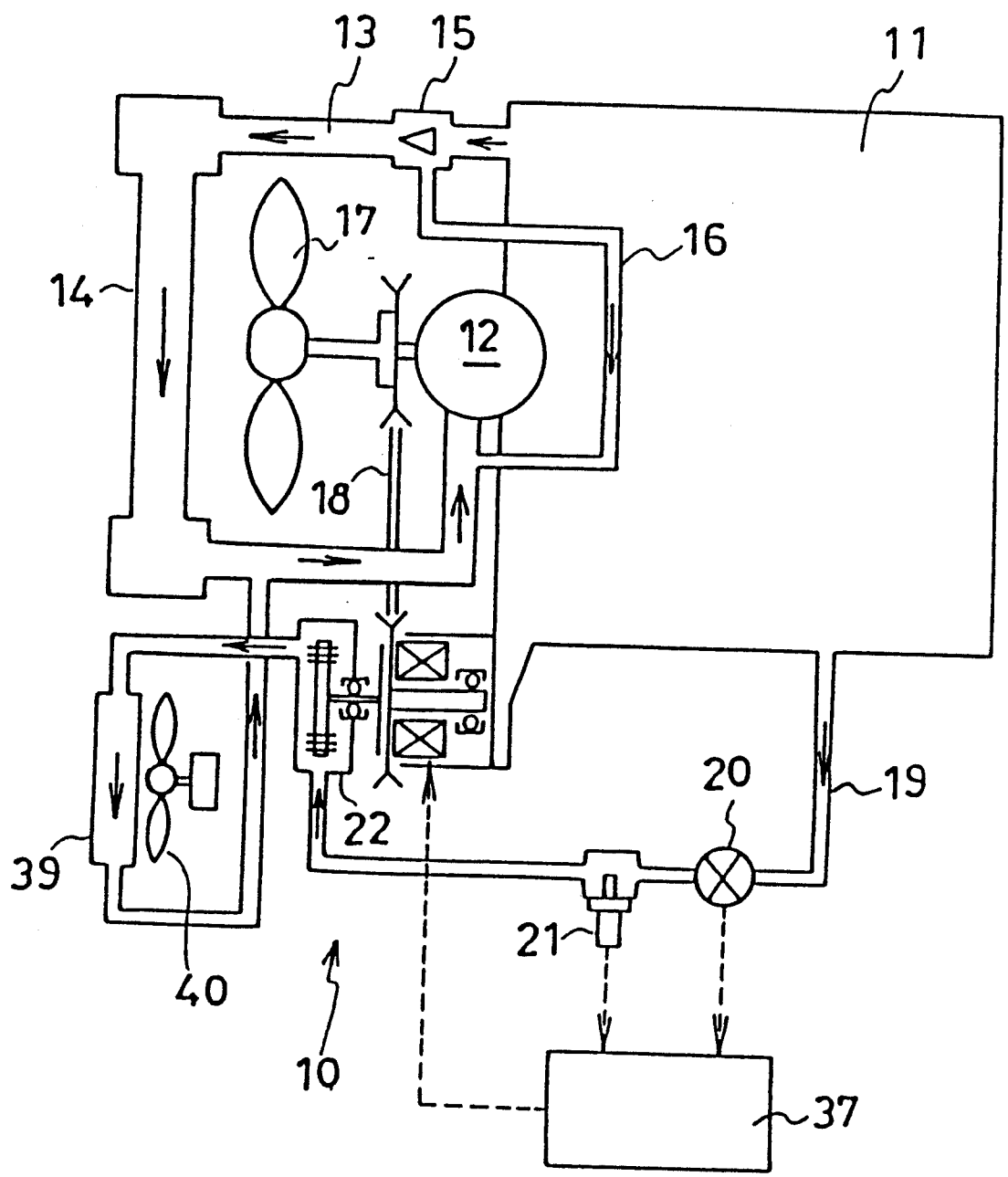
FIG. 1 is a schematic illustration of a preferred embodiment of an automobile heating apparatus according to this invention.
Figure 2:
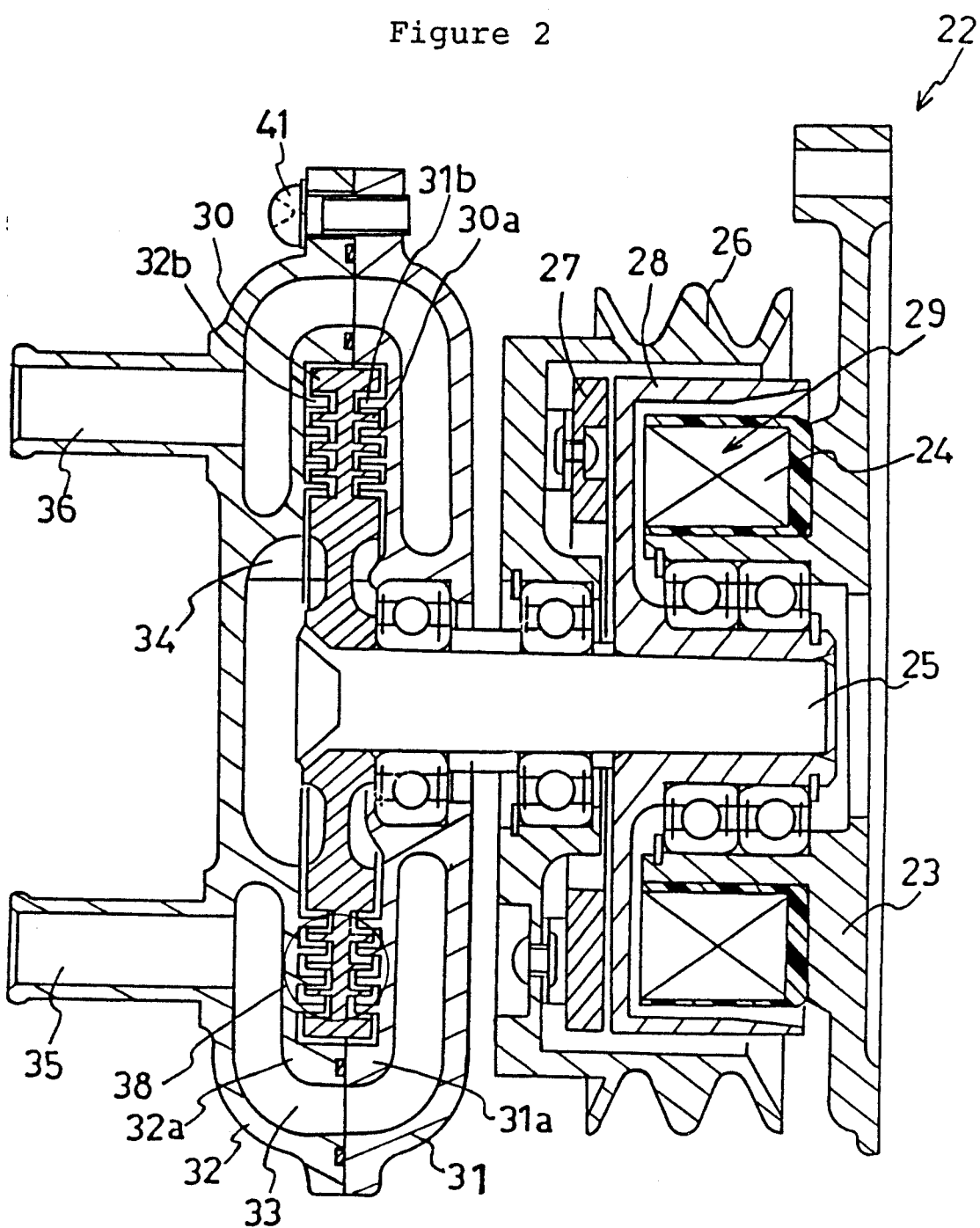
FIG. 2 is a cross-sectional view of a heat generator in the preferred embodiment thereof.
Figure 3:
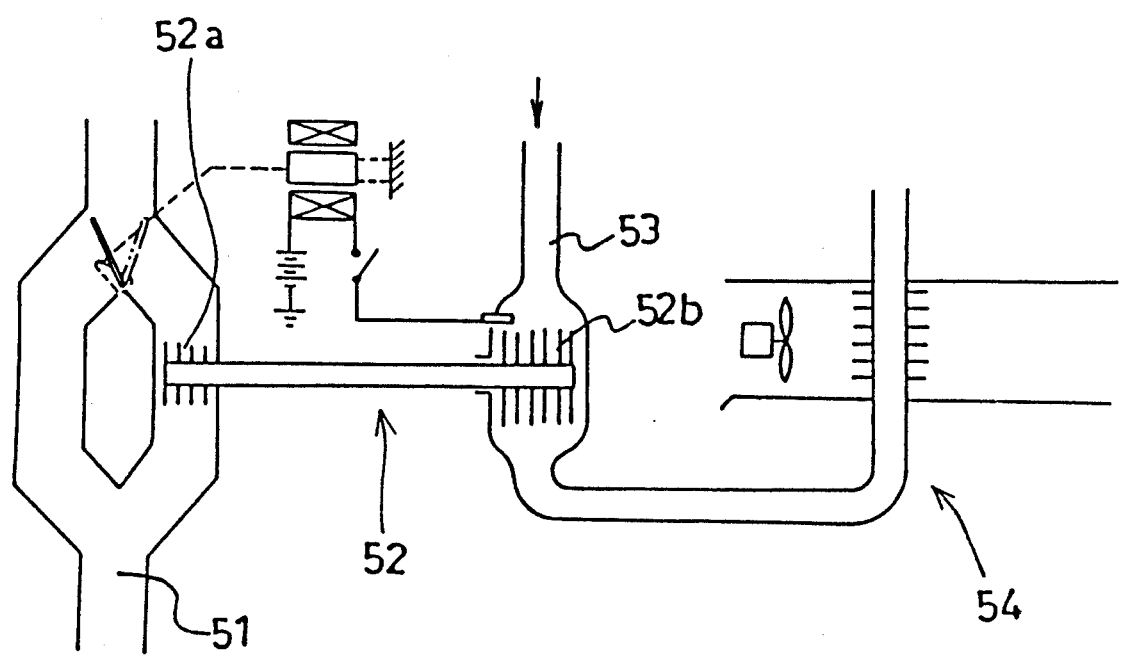
FIG. 3 is a schematic illustration of a prior art automobile heating apparatus.

A preferred embodiment of an automobile heating apparatus embodying the engineering means according to this invention will be hereinafter described with reference to the accompanying drawings. FIG. 1 is a schematic illustration of a preferred embodiment of an automobile heating apparatus 10 according to this invention, and FIG. 2 is a cross-sectional view of a heat generator 22 in the preferred embodiment thereof.

The cooling water for cooling an engine 11 is circulated in a conduit 13 and a radiator 14 by a water pump 12. A thermostat valve 15 is disposed at an intermediate position of the conduit 13, whereby the cooling water is delivered to a bypath conduit 16 when the temperature of the cooling water is low, and the cooling water is delivered to the radiator 14 when the temperature of the cooling water is high. A main fan 17 for cooling the radiator 14 is disposed in the rear of the radiator 14, and is subjected to the rotary force of a drive shaft (not shown) of the engine 11 by way of a belt 18.

A conduit 19 of a hot water circuit of a heating apparatus 10 is disposed independently of the conduit 13 of the cooling water circuit, and communicates the engine 11 with the water pump 12. A heater valve 20, a water temperature sensor 21, a heat generator 22 and a heater radiator 39 are provided in the hot water circuit, and the heat generator 22, the water temperature sensor 21 and the heater valve 20 are disposed respectively at upstream portions of the conduit 19 with respect to the heater radiator 39. A sub-fan 40 is disposed in the rear of the heater radiator 39. Further, a controller 37 is provided in order to receive signals from the heater valve 20 and the water temperature sensor 21 and to control the operation of the heat generator 22.

The heat generator 22, one of the major features of this invention, will be hereinafter described with reference to FIG. 2. A body 23 is disposed on the right-hand side of FIG. 2, and is to be fixed on the engine 11. The body 23 has an electromagnetic coil 24 fixed thereon, and holds a shaft 25 rotatably at the right hand-side thereof in FIG. 2 by way of an output disk 28 fixed on the shaft 25. An input pulley 26 is held rotatably on the shaft 25, and a plate 27 is fixed on the input pulley 26. An electromagnetic clutch mechanism 29, or clutch means according to this invention, thus comprises the electromagnetic coil 24, the plate 27 and the output disk 28.

A case 31 and a cover 32 are fixed integrally by bolts 41, and are to be fixed on the engine 11. The case 31 and the case 32 have partition walls 31a and 32a respectively in themselves, and form a heat receiving path 33 and a heat generating chamber 34. Labyrinth grooves 31b and 32b are formed respectively on the inner surfaces of the partition walls 31a and 32b. The shaft 25 is held rotatably by the case 31 at the left-hand side thereof in FIG. 2. A rotor 30 is fixed on the shaft 25 at the left end thereof in FIG. 2, and a labyrinth groove 30a is formed on the both surfaces of the rotor 30 at the periphery thereof. The labyrinth grooves 31b and 32b of the partition walls 31a and 31b and the labyrinth groove 30a of the rotor 30 engage, but leave a fine clearance among them, thereby forming a labyrinth groove portion 38.

A cooling water inlet port 35 and a cooling water outlet port 36 are formed integrally with the cover 32, and are disposed at the opposite positions of the cover 32 at the periphery thereof. Further, viscous fluid such as silicone oil is contained and sealed in the heat generating chamber 34.

The automobile heating apparatus 10 thus arranged operates as follows. When a driver operates to turn on the switch of the heating apparatus 10, the heater valve 20 is opened, and the cooling water for the engine 11 flows in the conduit 19 of the hot water circuit of the heating apparatus 10. This cooling water flows and reaches the water pump 12 by way of the water temperature sensor 21, the heat generator 22 and the heater radiator 39. When the cooling water is flowing in the heater radiator 39 and when it is being subjected to the wind generated by the sub-fan 40, the cooling water radiates the heat to the outside air, and the outside air thus heated is introduced into the automobile room, thereby heating the automobile room.

When the temperature of the cooling water is low and the heating apparatus does not work efficiently, namely when the heater valve 20 is opened and the temperature of the cooling water detected by the water temperature sensor 21 is lower than a predetermined value, the controller 37 turns on the electromagnetic clutch mechanism 29 of the heat generator 22. Accordingly, the rotary torque of the drive shaft (not shown) of the engine 11, which has been transmitted to the input pulley 26 by way of the belt 18, is now transmitted to the shaft 25 by way of the plate 27 and the output disk 28.

Consequently, the rotor 30 fixed on the shaft 25 at the left end in FIG. 2 rotates, and a shear force being proportional to the number of revolutions of the rotor 30 is applied to part of the viscous fluid contained and sealed in the heat generating chamber 34, namely to the viscous fluid placed in the labyrinth groove portion 38. Whereby the viscous fluid placed in the labyrinth groove portion 38 generates heat resulting from the increase in the internal energy and the friction force. The heat thus generated in the heat generating chamber 34 is transmitted to the cooling water flowing in the heat receiving path 33 by way of the partition walls 31a and 32b of the case 31 and the cover 32. As a result, the heat generated in the heat generating chamber 34 is given to the cooling water flowing in the heat receiving path 33, and the temperature of the cooling water is increased. The cooling water thus heated flows to the heater radiator 39, and radiates more heat to the outside air, thereby improving the heating capacity of the heating apparatus 10.

When the temperature of the cooling water flowing in the conduit 19 of the hot water circuit for heating becomes greater than the predetermined value, the controller 37 operates to turn off the electromagnetic clutch mechanism 29 of the heat generator 22. No rotary driving torque of the engine 11 is accordingly transmitted to the shaft 25. The rotor 30 does not rotate, and no heat generation occurs. Hence, no driving force of the engine 11 is consumed excessively.

Further descriptions on the controller 37 will be given hereinafter. If the heater valve 20 should be closed and the heat generator 22 should operate, the cooling water remaining in the heat receiving path 33 boils instantaneously because of the heat generation capability of the heat generator 22. Since the gas or water vapor then flows into the water pump 12, there is a fear for damaging the performance of the water pump 12. Hence, the controller 37 not only monitors the temperature of the cooling water flowing in the conduit 19 of the hot water circuit for heating but also the conditions of the heater valve 20 whether it is opened or closed.

Here, the heat generation capability of the heat generator 22 depends on the viscosity coefficient of the viscous fluid contained and sealed in the heat generating chamber 34, and can be set as desired accordingly. Namely, the higher the viscosity coefficient of the viscous fluids is, the greater the shear force is generated in the labyrinth groove portion 38, but the more the engine driving force is consumed. On the other hand, the lower the viscosity coefficient of the viscous fluids is, the smaller the shear force is generated in the labyrinth groove portion 38, but the less the engine driving force is consumed.

In addition, this preferred embodiment of the automobile heating apparatus according to this invention employs the electromagnetic clutch mechanism 29 for the clutch means, but the clutch means is not limited thereto. It is a matter of course that the clutch means may be any one of the following as far as it has a clutch mechanism: a multiple disk type hydraulic clutch, a pneumatic clutch, a viscous fluid clutch or a dry type clutch.

Having now fully described the invention, it will be apparent to one of ordinary skill in the art that many changes and modifications can be made thereto without departing from the spirit or scope of the invention as set forth herein.

What is claimed is:

1. A heat generator for an automobile heating apparatus comprising:
    a heat generating chamber having a labyrinth groove and containing viscous fluid therein;
    a housing disposed adjacent to said heat generating chamber and having a heat receiving path constituting part of a hot water circuit for heating an automobile room;
    a shaft held rotatably in said housing and receiving the rotary torque of an automobile water-cooling engine by way of clutch means; and
    a rotor fixed on said shaft at an end thereof and having a labyrinth groove disposed in said heat generating chamber.

2. The heat generator for an automobile heating apparatus according to claim 1, wherein said labyrinth groove of said rotor is disposed adjacent to and around the periphery end of said rotor.

3. The heat generator for an automobile heating apparatus according to claim 1, wherein said viscous fluid contained in said heat generating chamber is silicone oil.

4. The heat generator for an automobile heating apparatus according to claim 1, wherein said clutch means is one selected from the group consisting of an electromagnetic clutch, a multiple disk type hydraulic clutch, a pneumatic clutch, a viscous fluid clutch and a dry type clutch.

5. An automobile heating apparatus comprising:
    a water pump for circulating the cooling water for an automobile water-cooling engine;
    a radiator for heating the air to be introduced into the automobile room by utilizing said cooling water delivered by said water pump as a heat source; and
    a hot water circuit for circulating said cooling water in said automobile water-cooling engine, said water pump and said radiator;
    wherein a heat generator is disposed in said hot water circuit at an upstream portion with respect to said radiator, and said heat generator comprises:
    a heat generating chamber having a labyrinth groove and containing viscous fluid therein;
    a housing disposed adjacent to said heat generating chamber and having a heat receiving path constituting part of said hot water circuit;
    a shaft held rotatably in said housing and receiving the rotary torque of said automobile water-cooling engine by way of clutch means; and
    a rotor fixed on said shaft at an end thereof and having a labyrinth groove disposed in said heat generating chamber.

6. The automobile heating apparatus according to claim 5, wherein said hot water circuit further comprises: an opening-closing valve for opening and closing said hot water circuit; and control means for turning off said clutch means of said heat generator when said opening-closing valve is closed and turning on said clutch means of said heat generator when said opening-closing valve is opened.

7. The automobile heating apparatus according to claim 6, wherein said hot water circuit further comprises: a sensor for detecting the temperatures of said cooling water; and said control means turns off said clutch means of said heat generator when said temperatures detected by said sensor are a predetermined value or higher, regardless of the fact that said opening-closing valve is opened.

8. The automobile heating apparatus according to claim 7, wherein said control means turns on said clutch means of said heat generator when said opening-closing valve is opened and said temperatures detected by said sensor are less than a predetermined value.

* * * * *